No. 869,086. PATENTED OCT. 22, 1907.
C. E. HOFFMAN.
SAFETY SET SCREW.
APPLICATION FILED JAN. 4, 1907.
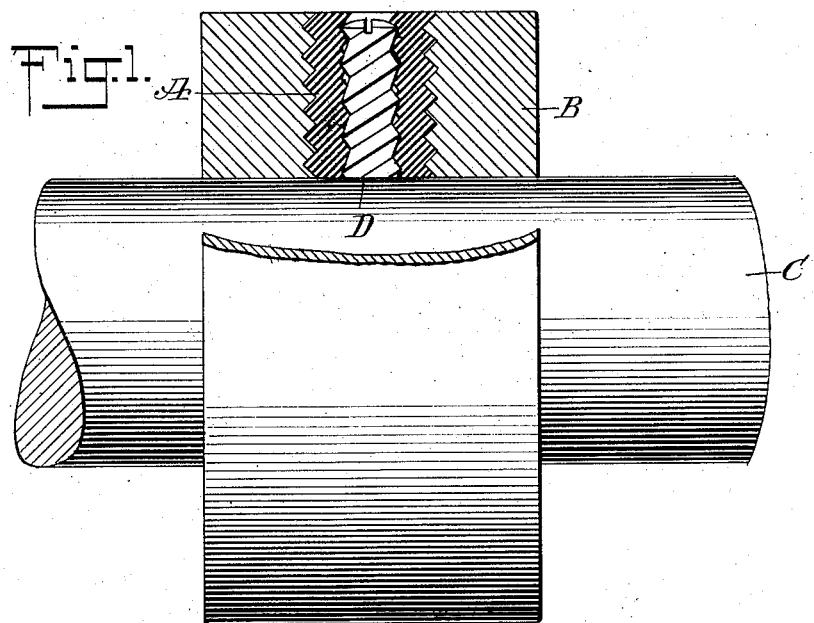
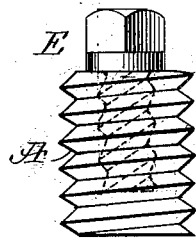
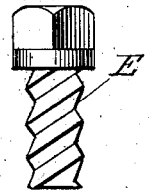
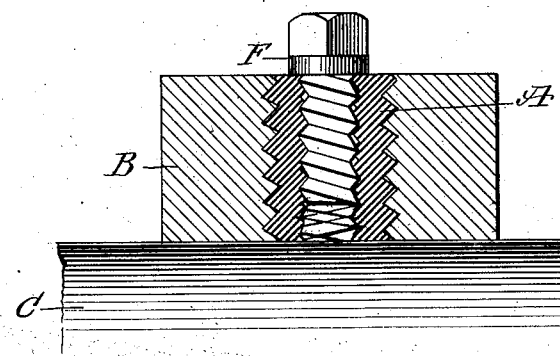
WITNESSES
William P. Goebel.
Geo. G. Hooker
INVENTOR
Clemence E. Hoffman
BY
Munn & Co
ATTORNEYS

UNITED STATES PATENT OFFICE.

CLEMENCE E. HOFFMAN, OF THOMASTON, CONNECTICUT.

SAFETY SET-SCREW.

No. 869,086.         Specification of Letters Patent.         Patented Oct. 22, 1907.

Application filed January 4, 1907. Serial No. 350,761.

*To all whom it may concern:*

Be it known that I, CLEMENCE E. HOFFMAN, a citizen of the United States, and a resident of Thomaston, in the county of Litchfield and State of Connecticut, have invented a new and Improved Safety Set-Screw, of which the following is a full, clear, and exact description.

The object of the invention is to provide a new and improved safety set screw for securely fastening machine parts in place, such as collars and pulleys on shafts and the like, the set screw leaving no projection and allowing convenient removal whenever it is desired to do so.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of the improvement as applied for fastening a collar on a shaft; Fig. 2 is a side elevation of a main set screw and of a headed screw for screwing the main set screw in place; Fig. 3 is a like view of the headed screw shown in Fig. 2, and Fig. 4 is a sectional side elevation of the main set screw as applied to a collar and shaft and showing the headed screw for unscrewing the main set screw.

The main set screw A illustrated in the drawings is made tubular and provided with an external screw thread and two internal screw threads running in opposite directions. The main set screw A screws in the collar B and against the shaft C, for securely fastening the collar in place, and in order to firmly lock the main set screw A in place in the collar B and to aid in fastening the latter to the shaft C, an auxiliary set screw D is employed screwing into one of the internal screw threads of the main set screw A. This auxiliary set screw D is slotted at its upper end for the convenient application of a screw driver or the like, to allow of screwing the auxiliary set screw D in place in the main set screw A or unscrewing it therefrom. As the main set screw A has two internal screw threads running in opposite directions and of different pitch, it is evident that the auxiliary set screw D may have right or left-handed screw threads.

In order to screw the main set screw A in position in the collar B a headed screw E is employed, and in order to unscrew the main set screw A in the collar B another headed screw F is employed. The headed screws E and F have right and left-hand threads, as plainly illustrated in Figs. 3 and 4, the threads being also of different pitch, as will be readily understood by comparison of Figs. 3 and 4. Now the headed screw E when screwed into the main set screw A until its head abuts against the outer end of the main set screw A, allows of screwing the main set screw A in place by applying a wrench or other tool on the head of the auxiliary set screw E. After the main set screw A is screwed in place the headed screw E is unscrewed, and then the auxiliary set screw D is screwed in position in the main set screw A, as above explained. When it is desired to unscrew the main set screw A it is necessary to first unscrew the auxiliary set screw D and then to screw the headed screw F in place, and keep on turning the same so as to unscrew the main set screw A in the collar B.

From the foregoing it will be seen that the main set screw can be readily screwed in place to securely fasten the collar B in position on the shaft C and without leaving external projections on the collar.

It will also be noticed that by the use of the auxiliary set screw D the main set screw A is securely locked in place and aids in fastening the collar B in position. Furthermore, the main set screw A can be conveniently screwed in or out of place, as above explained.

The internal screw threads of the main set screw A are of different pitch to avoid weakening the threads.

Having thus described my invention, I claim as new and desire to secure by Letters Patent:

1. A safety set screw having a longitudinal opening therein provided with internal screw threads running in opposite directions.

2. A safety setscrew having a longitudinal opening therein provided with internal screwthreads running in opposite directions, and interchangeable auxiliary setscrews having threads corresponding to the internal screwthreads, as and for the purpose set forth.

3. A safety set screw provided with a tubular body having an external screw thread, and internal screw threads running in opposite directions.

4. A safety set screw provided with a tubular body having an external screw thread, internal screw threads running in opposite directions, and an auxiliary set screw screwing in one of the said internal screw threads.

5. A safety set screw provided with a tubular body having an external screw thread, internal screwthreads running in opposite directions, an auxiliary set screw screwing in one of the said internal screw threads, and two headed screws having right and left hand threads for engagement with the said internal screw threads to screw up or unscrew the said safety set screw.

In testimony whereof I have signed my name to this specification in the presence of two subscribing witnesses.

CLEMENCE E. HOFFMAN.

Witnesses:
  J. O. BELDEN,
  T. C. HOFFMAN.